Patented Oct. 17, 1944

2,360,620

UNITED STATES PATENT OFFICE 2,360,620

PLASTER AND PLASTER PRODUCT

Robert D. Pike, Pittsburgh, Pa., assignor to Harbison-Walker Refractories Company, Pittsburgh, Pa., a corporation of Pennsylvania No Drawing. Application January 6, 1943, Serial No. 471,470

8 Claims. (Cl. 106—105)

This invention relates to plasters, more especially to those of the type useful for making wall boards, building blocks, and the like.

A primary object of the invention is to provide plasters which are of simple and inexpensive composition, are made from materials which are plentiful and generally available, set quickly to a body of good strength, are useful in the wall board and plaster trades, and may be used to make a wall board which is nailable and to which paper adheres well.

A further object is to provide articles, such as wall boards, from plasters embodying the foregoing characteristics.

I have discovered, and it is on this that the invention is in large part predicated, that the objects of the invention are attained by bonding precipitated calcium carbonate (CaCO₃) with a magnesium oxy-salt cement. To this end the plasters provided by the invention comprise, in addition to precipitated calcium carbonate, reactive magnesium oxide (MgO) and a magnesium salt which is reactive therewith to form the magnesium oxy-salt cement, or binder. The magnesium oxide is supplied most suitably in the form of lightly calcined magnesia. Magnesium chloride (MgCl₂) may be used as the cement-forming salt, but I prefer magnesium sulfate (MgSO₄) because the resultant plaster is more water resistant and does not tend to attract moisture.

Organic fillers may be added, if desired, and their use is particularly advantageous where nailability is needed.

The proportions of carbonate and binder may be varied according to the properties to be developed, but the invention will be understood by reference to the following examples. A plaster typical of the invention is made from 10 pounds of lightly calcined magnesia, 100 pounds of precipitated calcium carbonate, and 6 pounds of sawdust, as a filler. These ingredients are thoroughly mixed and the mixture is then gauged with 7.5 gallons of 18° Bé. magnesium sulfate solution. This provides a plaster having a tensile strength of about 80 pounds per square inch and whose properties are such that it can be used in place of gypsum in the wall board, building block, and allied fields.

In another case the amount of sawdust was doubled. This mix, after gauging, produced a workable mortar which set rapidly when heated to about 185° F. At this temperature such compositions set so that they may be handled after about 10 minutes. Wall boards made from it are readily nailable, are equivalent in strength to gypsum wall boards, and possess good adhesion to paper.

The sawdust or other organic filling material may be omitted, but fillers of this type are desirable because they reduce the weight of the product and improve the workability of the mortar. Also, when used the plaster may be aerated by the various means known in the art to provide porous products having good insulating properties.

The plasters described are useful not only for the making of wall boards and building blocks, and as plasters generally, but are suitable also for other uses to which gypsum and similar wall board plasters are applied, or for the making of partition tiles, particularly where, as indicated above, good strength, nailability and adhesion to paper are necessary.

According to the provisions of the patent statutes, I have explained the principle and method of practicing my invention and have described what I now consider to represent its best embodiment. However, I desire to have it understood that, within the scope of the appended claims, the invention may be practiced otherwise than as specifically described.

I claim:

1. A plaster composition comprising 100 parts by weight of precipitated calcium carbonate, 10 parts by weight of magnesium oxide, and magnesium sulfate in an amount to react with said magnesium oxide to bond said carbonate.

2. A plaster article, such as a wall board, formed from a mixture comprising about 100 parts by weight of precipitated calcium carbonate, about 10 parts by weight of magnesium oxide, and magnesium sulfate solution.

3. A plaster composition comprising a major proportion by weight of precipitated calcium carbonate, and minor proportions by weight of magnesium oxide and of magnesium sulfate.

4. A plaster composition comprising a major proportion by weight of precipitated calcium carbonate, and minor proportions by weight of magnesium oxide, magnesium sulfate and an organic filler.

5. A plaster article, such as a wall board, comprising a major proportion by weight of precipitated calcium carbonate bonded with a minor proportion by weight of magnesium oxy-sulfate.

6. A plaster article, such as a wall board, comprising a major proportion by weight of precipitated calcium carbonate and a minor proportion by weight of an organic filler bonded with a minor proportion by weight of magnesium oxy-sulfate.

7. A plaster composition according to claim 4, said filler being sawdust.

8. A plaster article according to claim 6, said filler being sawdust.

ROBERT D. PIKE.